United States Patent [19]

van Pham et al.

[11] Patent Number: 4,776,695
[45] Date of Patent: Oct. 11, 1988

[54] HIGH ACCURACY FILM THICKNESS MEASUREMENT SYSTEM

[75] Inventors: Hung van Pham; Wayne K. Borglum; Chester Mallory, all of Santa Clara County, Calif.

[73] Assignee: Prometrix Corporation, Santa Clara, Calif.

[21] Appl. No.: 902,993

[22] Filed: Sep. 2, 1986

Related U.S. Application Data

[63] Continuation-in-part of Ser. No. 864,623, May 16, 1986, abandoned.

[51] Int. Cl.[4] .......................... G01B 11/06; G01J 3/42
[52] U.S. Cl. .................................. 356/328; 356/308; 356/334; 356/382
[58] Field of Search ............... 356/307, 308, 309, 319, 356/323, 325, 326, 328, 331, 332, 334, 381, 382, 445–448; 364/498; 250/227

[56] References Cited

U.S. PATENT DOCUMENTS

| | | | |
|---|---|---|---|
| 3,637,310 | 1/1972 | Naono | 356/326 |
| 3,751,643 | 8/1973 | Dill et al. | 356/382 |
| 4,093,991 | 6/1978 | Christie, Jr. et al. | 356/326 |
| 4,165,180 | 8/1979 | Failes | 356/323 |
| 4,645,349 | 2/1987 | Tabata | 356/382 |

Primary Examiner—F. L. Evans
Attorney, Agent, or Firm—Flehr, Hohbach, Test, Albritton & Herbert

[57] ABSTRACT

A system for ascertaining the thickness of thin films, especially on semiconductor substrates, comprising a light source, a randomized bifurcated fiber optic bundle, a pentamirror, a rapid scanning monochromator with a rotating grating, a photodetector, and A/D converter, an interface and a data reduction computer. The randomized bifurcated fiber optic bundle via the pentamirror directs light to and receives reflected light from a surface of the thin film, the reflected light passes through the bifurcated bundle to the monochromator and to the photodetector whose output is read by the A/D converter. A timing control circuit is provided which has an input from an encoder coupled to the motor rotating the grating and clock and trigger outputs coupled to the A/D converter so that the A/D converter consistently samples the analog signal representative of the same portions of the reflected visible spectra returned from the thin film under test.

13 Claims, 3 Drawing Sheets

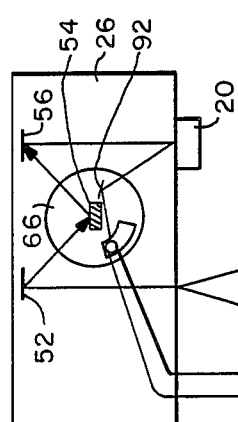
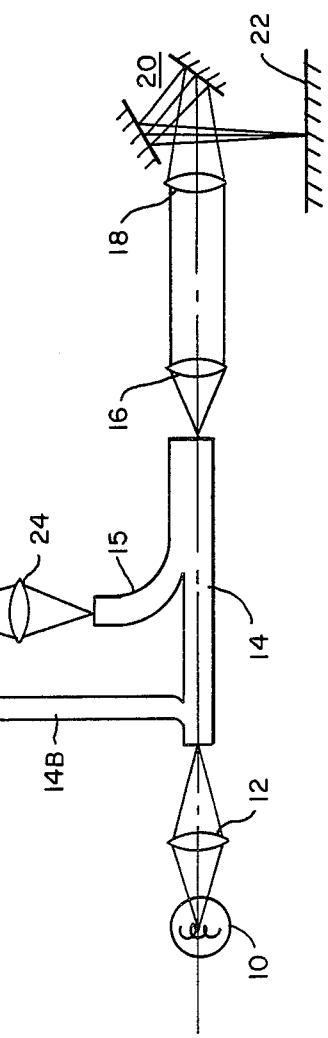
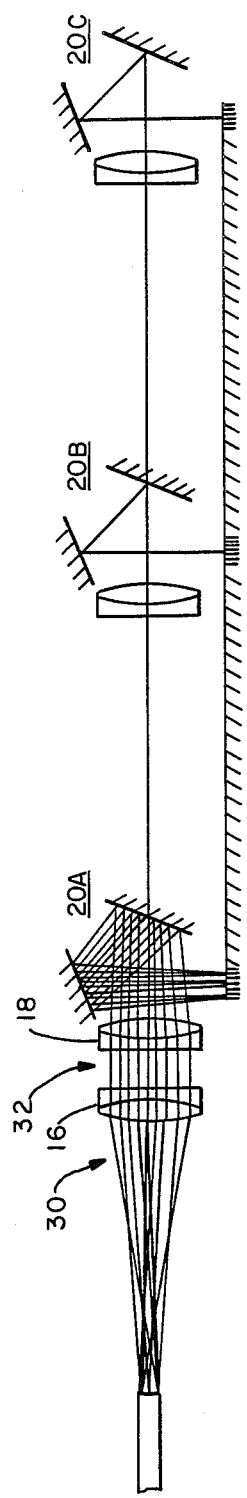
FIG.—1
FIG.—2

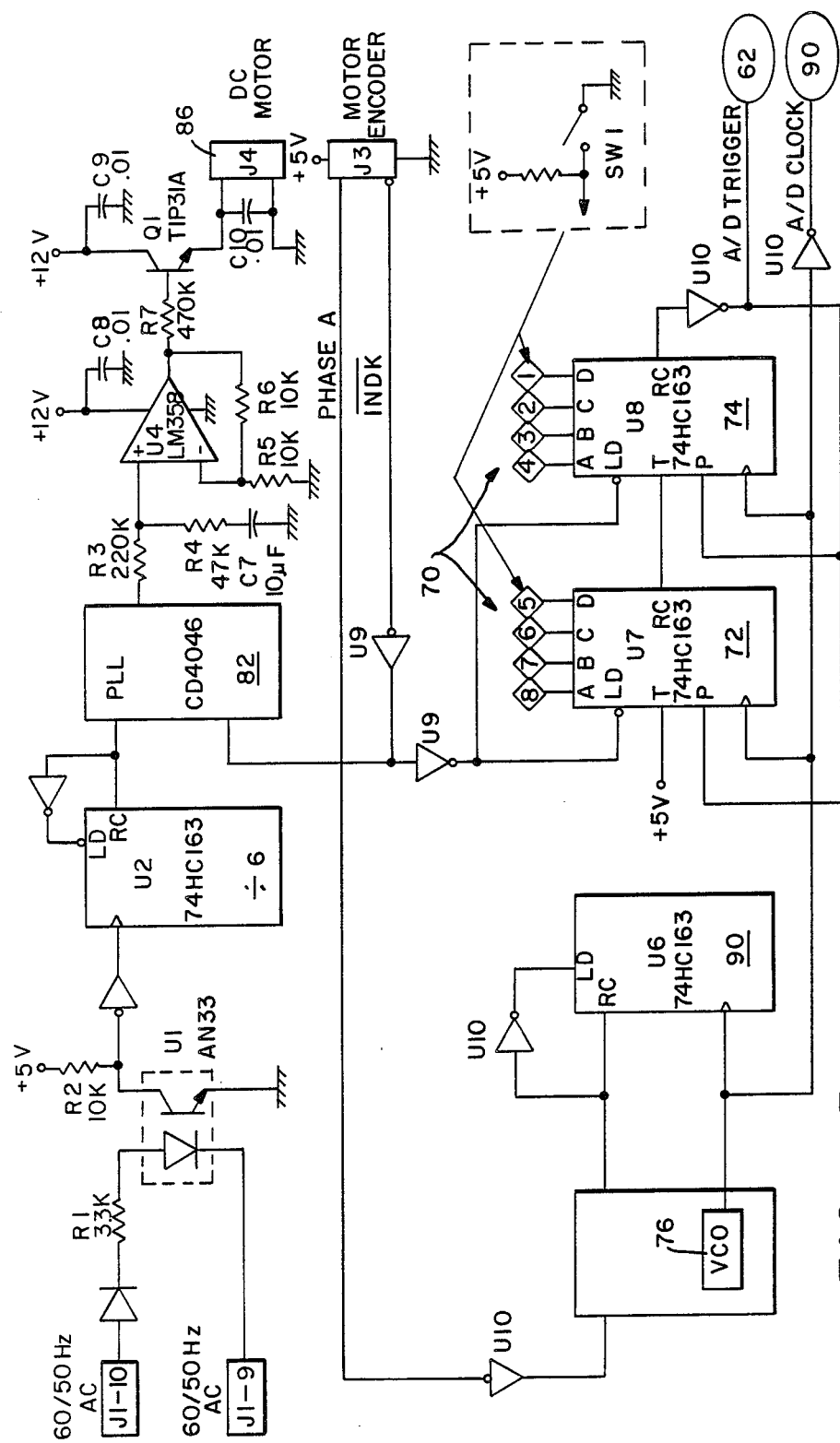
FIG.—3

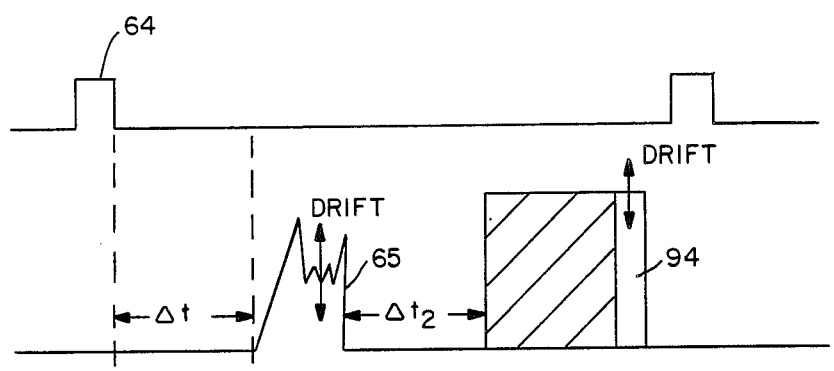
FIG.—4
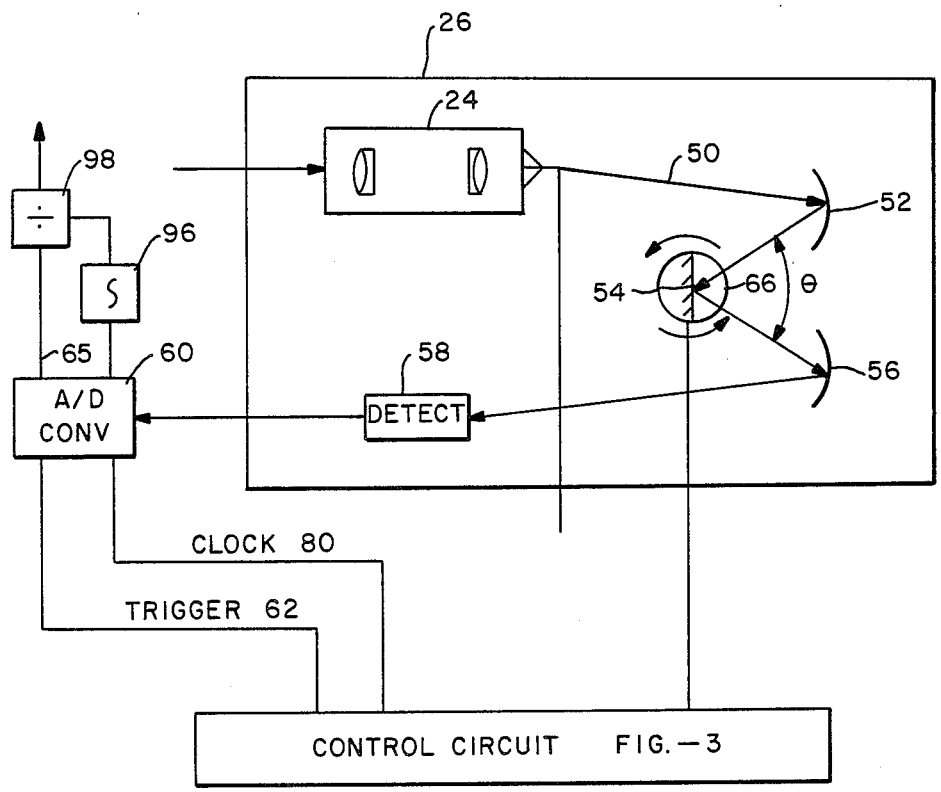
FIG.—5

HIGH ACCURACY FILM THICKNESS MEASUREMENT SYSTEM

This is a continuation-in-part of U.S. application Ser. No. 864,623 filed May 16, 1986, now abandoned.

CROSS-REFERENCE TO RELATED APPLICATION

The apparatus disclosed in this invention is especially useful with and may be easily incorporated into the application entitled "Apparatus and Methods for Semiconductor Wafer Testing" filed in the name of Chester L. Mallory, et al., on Apr. 24, 1985, Ser. No. 726,498, and assigned to the Assignee of the present invention. This application is incorporated herein by reference.

FIELD OF THE INVENTION

This invention relates generally to apparatus and method for ascertaining the thickness of thin films, especially on semiconductor substrates.

BACKGROUND OF THE INVENTION

One of the problems of modern semiconductor technology is the need for rapid determination of the thickness of transparent thin films on semiconductor substrates. Such measurements, to a high level of accuracy, are becoming increasingly significant as thinner films are being deposited, grown or sputtered on semiconductor substrates. It is especially important to conduct such a test in a non-destructive manner.

Therefore, it is an objective of the present invention to provide a system for non-destructive film thickness measurement.

Another objective of this invention is to provide a high accuracy film thickness measurement system, capable of thickness measurements accurate to the order of several Angstroms.

Yet another objective is to provide a film thickness measurement system capable of operating at high speeds, so that the processing sequence of wafers is not retarded by the testing sequence.

Another objective herein is to provide real time film thickness measurements, so that in the event of detection of some slight or minimal abnormality, a wafer can be further tested over an expanded portion of its surface to determine the extent of the process abnormality.

The basic theory on which film thickness measurement proceeds utilizing analysis of visible reflectance spectra, and the data reduction algorithm used in this measurement sequence are expressed in a number of articless, cited below and incorporated herein by reference:

Optical Thickness Measurement of SIO2-SI3N4 Films on Silicon, Reizman, et al., Soild State Electronics, Vol. 10, pp. 625–632 (1967);

IOTA, a New Computer Controlled Film Thickness Measurement Tool, Konnerth, et al., Solid State Electronics, Vol. 15, pp. 371–380 (1972);

Polycrystalline Silicon Film Thickness Measurement from Analysis of Visible Reflectance Spectra P. S. Hauge, Journal Optical Society of America, Vol. 69, No. 8, pp. 1143–1152, (August, 1979).

It has been known, for example, from the above IOTA article, to use a computer controlled system to provide rapid data acquisition and subsequent on-line reduction of the data in transparent thin film thickness measurements. This earlier system and subsequent systems have used randomized bifurcated fiber optic bundles aligned normal to the sample under inspection, the output being conveyed to a photodetector, A/D converter, interface and data reduction computer. However, such systems were lacking in both speed and accuracy.

Therefore, it is an objective of this invention to provide a modified optical system capable of rapidly scanning the illumination output of the bifurcated bundle across the surface of the wafer under test.

Further, a significant problem with the accuracy of the system resides in the accuracy of the analysis of the signal output of the photodetector. This receives the reflected illumination from the surface of the film being measured by way of the bifurcated fiber optic bundle and a scanning monochromator. As is well known, the scanning monochromator receives the light from the fiber optic bundle through an input slit, and reflects it off a first mirror onto a rapidly rotating grating. The reflection off the rotating grating during the period of a critical angle of rotation of the grate is passed to a second mirror and then to an exit port to a photodetector. It is essential to the accuracy and speed of analsis of the data that means be provided for accurately coordinating the rotational position of the rotating grating with triggering of the A/D converter which receives the output of the photodectector.

It is an objective of this invention to electronically provide this coordination, in order that the sample pulses applied to the clock input of the A/D converter and consistently aligned with the beginning of receipt of the output of the photodetector created by each single rotation of the scanning monochromator grating.

Because noise (e.g., 60~noise) can significantly degrade the accuracy of the system, it is a further objective of this invention to reduce or eliminate noise in the system.

Another problem with known systems is that the desired level of system accuracy is so high that variation in or degradation of system components can have a measurable negative effect. The most serious problems are from changes in output of the light source or the sensitivity of the photodetector.

An objective herein is to incorporate means for correcting for component drift or aging in the light source detector circuit.

The above objectives are achieved by providing a fiber optic bundle whose end face is substantially perpendicular to the wafer under inspection so that the emitted light travels in a path parallel to the surface of the wafer. A pentamirror system is provided to reflect the emitted light along a path which intersects the wafer at right angles. The return reflectance is reflected back through the same mirror system and onto the face of the fiber optic bundle. To prevent exact imaging of the return reflectance onto the emitting optics, the system is intentionally slightly defocused, so that the reflectance return is slightly blurred. Thus, each returning light image overlaps onto the neighboring image. The mirror reflecting system is mounted on a carriage, to move the analysis spot over the surface of the wafer. To convey the incident and reflected light to the sample, a pair of mirrors is provided. Both mirrors are carried on the carriage. The lenses are focused to collimate the light passing between the lenses.

The light return passes through the bifurcated bundle to a scanning monochromator of known design and to a photodetector whose output is read by an A/D converter. A novel circuit is provided for driving the motor which rotates the grating in the scanning monochromator while detecting the position of the grating relative to the mirrors. INDEX and PHASE signals are provided from an encoder coupled to the motor. The INDEX signal is provided first to the motor drive circuit, to be mixed in a phase-locked loop with the driving voltage signal to control the rotational position of the motor and enabling the correction for 60 cycle to prevent noise interference with the measurement. The same INDEX signal is coupled to a counter which generates the trigger signal to the A/D converter. The counter is provided with both the INDEX signal and the high frequency clock signal which will be used to sample the photodetector output. The clock signal itself is generated by a voltage controlled oscillator driven by a PHASE signal taken from the encoder. As a result of using the same INDEX signal to rotationally position the motor, and generate the trigger pulse for the A/D converter, the high frequencey sample pulses consistently occur in the same phase relationship with the output signal of the photodetector, so that the data reduction scheme is always sampling the same portions of the reflected visible spectra returned from the thin film under test.

The circuit for correcting for component drift and aging includes means for providing a sample of the same light used to illuminate the wafer under inspection to the same detector circuit used for the analysis. By integrating this sample and using it as a reference level for comparison of all data points derived from the spectral reflectance from a succession of images of the same wafer, the effect of componet aging is minimized or eliminated.

The use of this electronic system has enabled thin film measurements of very high accuracy.

The details of the specific embodiment of this invention will be described with respect to the following drawings wherein:

FIG. 1 is a block diagram of the elements of this invention;

FIG. 2 is an elevational view of the optics used to convey light output of the bifurcated fiber optic bundle to and from the wafer under test;

FIG. 3 is a detailed schematic diagram of the control electronics of this invention;

FIG. 4 is a timing diagram illustrating the relative timing of the INDEX pulse and photodetector output;

FIG. 5 is a more detailed view of scanning monochromator and output A/D converter of this invention.

The system of this invention essentially comprises a light source 10, focused through a lens 12 onto the input end of a bifurcated fiber optic bundle 14. The output of the bundle is imaged through a first fixed lens 16 and a second lens 18 movable with a mirrored system 20 to focus the output light of the fiber optic bundle onto the surface of the thin film 22 under inspection. The reflected light returns through the mirror system 20 and lens system 18, 16 to be imaged on the face of the bifurcated bundle 14. The return system of the fiber optic bundle conveys the returned light through an optic relay system 24 to the input of a scanning monochromator 26. The output of the monochromator is imaged on a detector 28 for analysis by an appropriate algorithm to determine the thickness of the film under test.

The use of a light and lens illumination system to illuminate a wafer surface through a bifurcated bundle is known in this technology as taught in the above-cited references. A lens and mirror arrangement is povided in this invention to eliminate the possiblility of changes in system transmittance due to bending changes in the fiber bundle. The output face of the fiber bundle which includes randomly interleaved fibers is imaged through a pentamirror system 20 which alters the line of travel of the light output 30 by 90°. A first lens 18 is mounted with the pentamirror to focus the light output onto the sample surface. The second lens 16 forms the image of the object of sample surface 22 onto the fiber bundle face. The ray fan 32 between the two lenses 16, 18 is collimated. This permits the air space between the two lenses to vary by a total of more than 75 mm for sample scanning while keeping the image in focus and at a constant magnification on the fiber bundle. FIG. 2 illustrates the imaging subsystem with the moving elements shown in three sample locations 20A, 20B, 20C as positioned by carriage 21 (FIG. 1). The first location is the retracted position that allows insertion of the sample into the measurement instrument; the other two locations are the center and edge of the sample.

In operation, the light emitted from the fiber bundle face is collimated by lens 16 and imaged onto the sample surface by lens 18 through mirrors 20. The reflected ray fans subsequently retrace their path and form an image of both the fiber bundle face and the sample surface back on the fiber bundle face. The fact that the fiber bundle face is reimaged on itself produces a potential problem. If the image quality were high and alignment nearly perfect, the image of the bundle face would lie exactly on itself. Sine the bundle 14 consists of randomly positioned emitting and receiving fibers, the emitting fiber images would lie on themselves and not inject energy into the receiving fibers. Small changes in alignment could cause large changes in received signal level. According to the proposed invention, this problem is avoided by purposely placing the lenses 16, 18 in reverse orientation. The doublets are designed to minimize spherical aberration for collimated ray fans incident on the crowned element, but they have been placed so the collimated ray fans are incident. This arrangement introduces a modest amount of spherical aberration but leaves the system nearly achromatic, so all wave lengths tend to be imaged at the face of the fiber bundle with a blur that spreads each individual fiber image onto the image of its neighbor. The result is that the image of the fiber bundle is nearly a uniformly irradiant circle rather than an accumulation of individual bright fiber images. Having created the return image, it is passed through the receiving portion of fiber optic bundle 15 to the lens relay system 24.

The output of the lens 24 is passed to the scanning monochromator 26 which is shown in more detail in FIG. 5. The light passes into the monochromator 26 along optical axis 50. This optical axis is at a 7° angle to the instrument center line, and is incident upon a mirror 52 which has its axis tilted at 12.5° from the incoming axis. The reflection from the mirror 52 is inclined at 25° from the original direction and is incident upon the plane grating 54 which is mounted for rotation by a motor (not shown). As can be seen in FIG. 5 and as is well known in scanning monochromator technology, the reflective path for light incident on mirror 52 and grating 54 is continued on to mirror 56 only for a limited arc $\theta$ of the complete rotation of the grating 54. In this particular device, where the light spectrum ranging from 400 nm to 800 nm is to be sampled, the total rotational angle which is to intercept the incident light is 15.6956°. The grating 54 itself has a spatial frequency of 1200 grooves per millimeter chosen to provide the desired reciprocal linear dispersion. The output of the grating 54 is imaged on a second mirror 56 and passed to a detector 58 which may typically be a photodetector or the like. The output of the detector is an analog signal 65 representing the reflected light from the thin film under inspection in the spectrum of interest which is imaged on A/D converter 60.

Upon consideration of the system shown in FIGS. 1 and 5, it became apparent to the inventors that successful implementation of this system requires that the initiation of sampling by the A/D converter 60 in response to the trigger signal on line 62 and clock pulses on line 80 be at exactly the same time the grating is rotating through the angle of interest to provide the spectral output 65 to the photodetector. As shown in FIG. 4, this may be at any time $\Delta T$ after the INDEX pulse 64 which is generated using a position encoder 66 on the motor. This time differential $\Delta T$ can be accurately fixed in the following manner so that analysis of the spectral output 56 of the photodetector output always starts exactly the same time lag $\Delta T$ *after the INDEX pulse* 64 *is generated*.

A complete rotation of the grating 54 through 360° is represented by 500 pulses from the output PHASE A (FIG. 3) of the encoder 66. The "home" position of the encoder is established by the INDEX pulse 64. The end of time $\Delta T$ corresponds to the point in time where the grating 54 enters the arc $\theta$ relative to the arbitrarily selected INDEX point. A simple test establishes exactly how many pulses from the encoder 66 on PHASE A are needed to represent this time $\Delta T$.

The control circuit of FIG. 3 includes a clock and counter circuits 76, 90 and trigger circuit 72, 74 to provide trigger 62 and clock 80 signals to the A/D converter 60.

Once the relationship of the INDEX position of the encoder plate relative to the grating has been determined, time lag $\Delta T$ can be defined by setting the dip switches 70 shown on the counters 72, 74 which form the trigger circuit for the A/D converter 60. These counters 72, 74 also receive the INDEX signal. The counters are clocked by the output of a voltage controlled oscillator 76 which responds to the PHASE signal from the encoder. Essentially the counter 72, 74 responds to each INDEX pulse to begin counting; count pulses are provided by VCO 76; and output of the trigger pulse to the A/D converter is delayed by a number of counts representing time $\Delta T$ as set up on switches 70. In this way, the operation of the counters 72, 74 to generate trigger 62 is initiated with each rotation of the encoder 66 by generation of the INDEX signal.

This same INDEX signal is also provided to a PHASE locked loop 82 which is incorporated between the line voltage source 84 and the output drive signal to the DC motor 86. The line voltage itself is a 60-cycle signal which is divided by 6 to provide a 10-cycle-per-second signal. Tying the control voltage to the motor to the INDEX signal in PLL 82 provides consistent rotational positioning of the motor as well as providing for correction of 60-cycle noise in the system.

As can be seen, the voltage controlled oscillator 76 is driven by the PHASE A signal to insure a stable pulse count rate and lock the system to the line frequency. The stability of the VCO is insured by the counter 90 to which the VCO output is tied. The output of the voltage controlled oscillator provides exactly 2,000 clock signals to the A/D clock input for each complete rotation of the position encoder. The same output is tied to one input of the counter 72, 74 which also receives the INDEX signal and has the manually preset angular offset spacing representing the number of pulses which must be counted before the time $\Delta T$ elapses, and analysis of the signal 65 which is the photodetector output can begin.

By providing this relationship between the high frequency clock pulses which are to be provided on clock line 80 to A/D converter 60, the INDEX signal which appears once per rotation of the grating and the trigger signal which initiates operation of the A/D converter, sampling of the actual reflected signal during each rotation of the grating begins at exactly the same point in time relative to the signal received from the photodetector. As a result, analysis and data reduction can be carried out with an extremely high level of consistency and accuracy.

A further improvement in this invention comprises means for correcting for the effect of component drift on the output of the A/D converter. Examples of such drift especially may comprise situations where the light source 10 brightens intermittently because of variations in line voltage, or dims with age. Alternatively, the output of the photodetector 58 may change if the detector becomes more or less sensitive.

To solve this problem, modifications have been made to the structure described above to provide a sample of the light source 10 directly to the photodetector and the A/D converter which may be operated on to generate an average reference light level. This level may be used to scale the spectral data which comprises the reflected light from the surface under inspection, so that the system output is standardized with respect to a common base line.

More particularly, referring to FIG. 1, a portion 14B of the fiber optic bundle 14 may be led directly to the housing 26 of the monochromator. It is important that this sample from the light source 10 strikes photodetector 58 at the monochromator housing in a fixed time relationship relative to receipt of the spectral output 65.

More particularly, the reference data 94 (FIG. 4) in this preferred embodiment should be received at the photodetector a time period $\Delta T2$ after receipt of the spectral output 65. This achieved by aligning the end of the fiber optic 14b carrying the reference light sample with a slot 90 in the disc 66 which is carrying the grating 54. During the majority of the rotation of the disc, including the time the grating is aligned with the reflective mirrors 52, 56 to provide the spectral output to the photodetector, the output of the fiber optic bundle 14b is blocked. However, when the slot 90 is aligned with the end of the bundle, the light passes from the end of the bundle to a mirror 92 mounted within the housing 26, and aligned with the end of the bundle to reflect the light to the slit leading to the detector or photodetector 58. By proper alignment of the slot 90 relative to the grating 54, the reference light 94 reaches the photodetector 58 a known, fixed period $\Delta T2$ after receipt of the spectral data 65. This data 65, 94 is then applied to the A/D converter 60. The output of the A/D converter first comprises a series of data points representing the digitized spectral output 65, followed by a series of points or digital values representing the reference level 94. These reference level points may be integrated over time 96 and averaged to provide an average reference light level. This level is used at 98 to scale the spectral data output; by introduction of the scaling factor, the absolute value of this spectral data output is consistent over time, despite variations in the output of the light source 10 changes in sensitivity of photodetector 58 or other changes in the system.

Modifications of the present invention may become apparent to a person of skill in the art who studies this invention disclosure. Therefore, the scope of the invention is to be limited only by the following claims.

What is claimed:

1. In an automatic system for measuring the spectral reflectance of thin film samples deposited on specular flat surfaces over a limited wavelength region, the system comprising
    a light source means for providing illumination to the thin film sample,
    a bifurcated fiber optic bundle having randomly interleaved input and output fibers whose ends are vertically aligned over the sample for conveying said illumination to the thin film sample and reflected illumination away from said thin film sample,
    a scanning monochromator responsive to the reflective illumination gathered by the output fibers to image portions of said relfected illumination on a photodetector, said monochromator including an input and an output slit, first and second mirror surfaces mounted in substantially the same plane and a motor-driven constantly rotating plane grating surface mounted in an optical path between the first and second mirror surfaces for conveying said reflected illumination to said photodetector,
    an analog-to-digital converter coupled to said photodetector to convert an analog reflected illumination signal from said photodetector into a digital reflected illumination signal for analysis in terms of intensity and wavelength of said reflected illumination, and
    timing control means having an input from an encoder coupled to said motor and clock and trigger outputs coupled to said analog-to-digital converer to consistently sample the analog signal representative of the reflected illumination returned from the thin film sample through said fiber optics relative to a consistent rotational position of said grating whereby the initiation of sampling by said analog-to-digital converter always occurs at exactly the time said plane grating is rotating through a precise angle of interest during rotation of said grating.

2. A system as in claim 1 wherein said timing control means includes a first control circuit means coupled between line voltage and the motor for controlling the speed of the motor and a second control circuit means coupled between said encoder and said analog-to-digital converter to trigger and clock said converter, the first and second control circuit means both being responsibe to an INDEX signal from said motor encoder to precisely control the rotational angle of said motor and said grating.

3. A system as in claim 2 wherein said first motor control circuit means includes a phase locked loop connected between the line voltage input and the motor speed control output and responsive to the line voltage signal and the INDEX signal to consistently control the rotational position of the motor.

4. A system as in claim 3 wherein said second control circuit means comprises a voltage controlled oscillator responsive to a PHASE signal from said oscillator to generate said clock signals to said analog-to-digital converter, and a trigger circuit comprising a manually preset counter responsive to said clock signals and said INDEX signal to generate said trigger signal a preset number of clock pulses after said INDEX signal so that the sampling period of the reflected illumination is precisely controlled.

5. A system as in claim 2 further comprising means for focusing the output of said fiber bundles on said thin film including, a folded multiple mirror arrangement for reflecting said ray path between the bifurcated bundle and the thin film for causing said input illumination to strike said thin film and for returning the reflected illumination to the end face of said bifurcated fiber optic bundle, and carriage means for positioning said mirror arrangement horizontally over said thin film to inspect all of the surface of said thin film.

6. A system as in claim 5 including lens means comprising first and second lenses, mounted between said bifurcated fiber bundle and said folded multiple mirror arrangement for collimating light between said bundle and said mirror arrangement, said first lens being mounted stationary relative to said fiber bundle and said second lens being movable with said mirror assembly so that the illumination can be moved selectively over the entire surface of the thin film sample.

7. A system as in claim 6 wherein said fiber optic bundle includes said input fiber optics for conveying illumination to said sample and said output fiber optics for conveying the reflected return from the sample to said monochromator, said lenses are spherical and mounted to introduce spherical aberration into said illumination of said sample whereby the return, reflected image created by the output of said each fiber optic of said bundle is blurred to spread onto a image from an adjacent fiber optic, so that the reflected illumination return image from the sample spreads from the input to the output fibers.

8. A system as in claim 1 including means for correcting for effects of drift on the output of said analog-to-digital converter comprising second timing means for providing a sample of said light source directly to said photodetector for conversion to an electrical signal representing said light source,
    reference means responsive to said photodetector for operating on said light source electrical signal to generate a light reference level signal, and
    means for comparing said reference level signal to said reflected illumination signal whereby effects of system component drift in said reflected illumination signal are eliminated.

9. A system as in claim 8 wherein said second timing means comprise a rotating plate driven by said motor and supporting said plane grating surface for moving said grating through said optical path, a portion of said fiber optic bundle extending from said light source to terminate in the vicinity of said plate, said plate including a slot adjacent the end of said fiber optic portion to pass a sample of the output of said light source directly to said photodetector whereby said photodetector also consistently receives a sample of the light from the light source incident on the thin film sample wafer, so that changes in the intensity of the light from the light source can be monitored.

10. A system as in claim 9 wherein said slot is so located in said rotating plate relative to said plane grating as to define a timed relationship between said reflected illumination from said thin film sample reaching said photodetector and said light from said light source reaching said photodetector.

11. A system as in claim 10 wherein said slot is limited in length to limit the time light from said source reaches said photodetector.

12. A system as in claim 8 wherein said second timing means include means for providing light from said light source to said photodetector for a defined period of time, said reference means integrating said electrical signal over said defined period of time to generate said reference level signal.

13. A system as in claim 12 wherein said comparing means include means for dividing said reflected illumination signal by said reference level signal to normalize the scale of said reflected illumination signal.

* * * * *